Patented Dec. 7, 1948

2,455,890

UNITED STATES PATENT OFFICE 2,455,890

POLYSTYRENE-MINERAL OIL EXTRACT PLASTIC COMPOSITION

Eric William Musther Fawcett, Albert Millien, and Norah Mulhern, Sunbury-on-Thames, England, assignors to Anglo-Iranian Oil Company Limited, London, England, a British corporation No Drawing. Application January 27, 1944, Serial No. 519,948
In Great Britain January 2, 1943

2 Claims. (Cl. 260—33.6)

This invention relates to the production of polystyrene compositions suitable for use in the manufacture of coating materials, moulded articles, electrical insulation compounds and the like.

It is known that polystyrene is a brittle material and even a thin film of the pure material will generally fracture if bent through 180°.

According to the invention non-volatile hydrocarbons of high molecular weight which may be derived as hereinafter described from mineral oil fractions boiling approximately in the range 250–800° C. at 760 mm. mercury pressure, and which have high solvent power and a high degree of compatibility with polystyrene, are intimately incorporated with polystyrene for example in the condition of powder or in solution with the hydrocarbons in a volatile mutual solvent, whereby determined physical characteristics such as plasticity or degree of hardness of the eventual product may be imparted according to the proportion and character of the hydrocarbons incorporated. Moreover, as in order to obtain a high degree of plasticity, it is necessary to incorporate a relatively high proportion of the hydrocarbons, a considerable economic advantage results from their use. The hydrocarbons may therefore be regarded as fillers and/or plasticisers according to the proportion incorporated in the composition. Thus for example a useful composition may consist of equal proportions by weight of polystyrene and the hydrocarbons.

The intimate incorporation of the hydrocarbons in polystyrene compositions in determined proportions results in improved flowing properties in the moulding operation, while in view of their non-polar character the electrical and water resistant character of the products are excellent. The adhesion of polystyrene to a metal surface is also improved by the incorporation of the hydrocarbons.

The hydrocarbons used according to the invention may be prepared by processing a fraction of a mineral oil of relatively high molecular weight, and may for example be obtained as a by-product of the production of high grade lubricating oils. Thus a high boiling mineral oil fraction may be extracted at a determined temperature with a selective solvent or mixture of such solvents that may be of a polar character such as sulphur dioxide, sulphur dioxide-benzene mixtures, furfural, phenols and the like. The hydrocarbons are then found in solution in the solvent phase from which they may be recovered in any convenient manner, usually by distilling off the solvent.

Or again a high boiling mineral oil fraction may be treated with a normally gaseous paraffin such as propane, advantageously under conditions of low temperature of from not substantially less than 26° C. and at a superatmospheric pressure of not less than 12 atmospheres to yield a second viscous liquid or resinous phase, substantially free from the light hydrocarbon. This second phase contains the desired hydrocarbons.

Or again a high boiling mineral oil fraction may be treated with sulphuric acid and the acid sludge separated. This sludge may then be neutralised with an alkaline material such as caustic soda, and the hydrocarbons recovered by distillation of the neutralised product, advantageously in vacuo.

However prepared the hydrocarbons used range from moderately viscous oils to resinous materials according to their molecular weight, having a high specific gravity, usually in the range 0.995 to 1.075. The average molecular weight lies between 200 to 850 and generally between 250 and 750 although materials of higher or lower molecular weight may be employed. The hydrocarbons used are also characterised by a relatively high carbon content. Thus their molecules contain on an average at least .6 atom of carbon per atom of hydrogen.

The properties of the hydrocarbons used indicate an aromatic hydrocarbon character, although a proportion of unsaturated linkages are generally present, and they may contain a minor proportion of sulphur and nitrogen in combined form.

In contradistinction to the mineral oil fractions from which they are prepared, the hydrocarbons used are characterised by a high degree of compatibility with polystyrene. They may therefore be used in high concentration in polystyrene compositions as plasticisers and/or fillers either alone or together with known plasticisers or fillers, without marked deterioration of the mechanical properties of the product or the appearance of a surface tackiness.

The hydrocarbons prepared as hereinbefore described may be incorporated directly with polystyrene or in a polystyrene composition or they may be first refined, purified or fractionated, or subjected to a chemical modification process, or to a sequence of such processes. Thus the crude products may be distilled in vacuo in order to obtain light coloured materials. Alternatively, the hydrocarbons may be submitted to any other fractionation process such as further solvent extraction, fractional absorption and de-sorption on materials such as alumina or adsorbent earths or precipitation from solvents, in order to select the best fractions for utilisation, which generally are those fractions having a high specific gravity.

The crude materials may be modified by chemical treatment as for example by chlorination, air blowing or dehydrogenation by heating with sulphur or selenium at elevated temperatures. This chemical treatment may be followed by a purification or fractionation treatment prior to the incorporation of the hydrocarbons in the polystyrene composition.

The admixture of the hydrocarbon fractions with polystyrene, or with polystyrene and other materials of the composition may be carried out in a variety of ways. Thus the ingredients may be mixed in standard mechanical mixing equipment. Or again the polystyrene in powder form may advantageously be mixed with a determined proportion of the hydrocarbons at room temperature, and the mixture subjected to heat at an elevated temperature of about 100° C., to yield a plastic mass, which can be readily converted into a compact sheet on a callendering machine or otherwise be moulded under pressure.

A further treatment, particularly advantageous for the production of coating compositions, consists in the solution of the polystyrene and the hydrocarbons in a volatile mutual solvent, such as benzene or xylene, followed by removal of the solvent by distillation, or in the case of coating compositions, by direct evaporation after the coating operation. The composition may however be prepared in dispersed form by emulsification of the solution of polystyrene and the hydrocarbons with an aqueous phase containing an emulsifying agent, such for example as ammonium oleate.

The proportion of the hydrocarbons to be incorporated in the composition depends on the particular hydrocarbon fraction selected and the softness and plasticity required in the finished product. In general terms, proportions up to about 200 parts by weight of the hydrocarbons to 100 parts of polystyrene yield useful results.

For moulded goods where a hard product of high impact strength is required, the composition may usefully contain 50 parts by weight of the hydrocarbon to 100 parts of polystyrene together with other fillers and plasticizers as may be indicated by the required characteristics of the product. If a high proportion of solid fillers is required, the proportion of hydrocarbons may be increased with advantage.

For the production of a highly plastic structure suitable for coating wires by extrusion, a mixture of about 100 parts of the hydrocarbons with 100 parts of polystyrene will usually give satisfactory results.

The following are practical examples of the manner in which the invention may be carried out.

Example 1.—This example illustrates two ways of producing the type of hydrocarbon material for use according to the invention.

(a) 100 parts by volume of a distillate from crude petroleum having a boiling range of 360–525° C. at a pressure of 760 mms. of mercury are treated with 200 parts by volume of a mixture of sulphur dioxide (85%) and benzene (15%) at 127° F. The solvent phase is freed from sulphur dioxide and benzene by distillation, and the residue is distilled under a pressure of .1 mm. of mercury yielding 30 parts by volume of a light coloured viscous oil having a boiling range of 400–470° C. at atmospheric pressure and a molecular weight of 330.

(b) 100 parts by volume of a crude petroleum residue, having a boiling range of 400–650° C. at atmospheric pressure are treated with 220 parts of furfural at 130° F. The extract, freed from furfural is distilled in vacuo, to yield 25 parts by volume of a viscous oil having an approximate boiling range of 400–550° C. at atmospheric pressure and a molecular weight of 420.

Example 2.—100 parts by weight of polystyrene and 50 parts of the hydrocarbon fraction prepared as in Example 1(a) were dissolved in 400 parts of benzene. The solution freed from benzene by distillation, left a hard polystyrene composition of high impact strength suitable for moulding or coating compositions.

Example 3.—100 parts by weight of powdered polystyrene and 100 parts of the hydrocarbon fraction prepared as in Example 1(a) were mixed and heated to 100° C. for 2 hours. The plastic mass thus obtained was passed through a roll mill to form a sheet. The product was a highly plastic composition suitable for wire coating by the extrusion process.

We claim:

1. A process for the production of an improved polystyrene composition which comprises mixing with polystyrene, at an elevated temperature sufficient to yield a plastic mass, a hydrocarbon fraction obtained by solvent extracting a high boiling mineral oil fraction having a low degree of compatibility with styrene boiling in the boiling range of 250° C.–800° C. at 760 mm. mercury pressure and containing non-volatile hydrocarbons of non-polar character, high carbon content averaging at least .6 atom of carbon per atom of hydrogen, high specific gravity in the range 0.995 to 1.075 and high average molecular weight in the range 200 to 850 which have a high solvent power and a high degree of compatibility with polystyrene, said hydrocarbons and said polystyrene being mixed in the proportions up to 200 parts by weight of the hydrocarbons to 100 parts by weight of polystyrene.

2. As a composition of matter, an improved polystyrene composition comprising polystyrene in admixture with a hydrocarbon fraction derived from a high boiling mineral oil fraction having a low degree of compatibility with polystyrene and boiling in the boiling range of 250° C.–800° C. at 760 mm. mercury pressure, by extraction of said mineral oil fraction with a selective solvent, the hydrocarbons of said hydrocarbon fraction being non-volatile and of non-polar character, having a high average molecular weight in the range 200 to 850, a high specific gravity in the range 0.995 to 1.075, a high carbon content averaging at least .6 atom of carbon per atom of hydrogen, and a high solvent power for and a high degree of compatibility with polystyrene, and, said hydrocarbon fraction and the polystyrene being in the ratio of up to 200 parts by weight of said fraction to 100 parts by weight of polystyrene.

ERIC WILLIAM MUSTHER FAWCETT.
ALBERT MILLIEN.
NORAH MULHERN.

(References on following page)

REFERENCES CITED

The following references are of record in the file of this patent:

UNITED STATES PATENTS

| Number | Name | Date |
|---|---|---|
| 1,792,102 | Lawson | Feb. 10, 1931 |
| 1,836,021 | Gibbons | Dec. 15, 1932 |
| 2,180,367 | Rostler | Nov. 21, 1939 |
| 2,185,952 | Rostler | Jan. 2, 1940 |
| 2,210,434 | Rosenthal et al. | Aug. 6, 1940 |
| 2,217,918 | Rostler | Oct. 15, 1940 |
| 2,217,988 | Lawson et al. | Oct. 15, 1940 |
| 2,272,996 | Warner et al. | Feb. 10, 1942 |
| 2,285,562 | Britton | June 9, 1942 |
| 2,334,582 | Read | Nov. 16, 1943 |
| 2,350,007 | Zerbe | May 30, 1944 |
| 2,374,067 | Alerson | Apr. 17, 1945 |

FOREIGN PATENTS

| Number | Country | Date |
|---|---|---|
| 514,156 | Great Britain | Nov. 1, 1939 |

OTHER REFERENCES

Plastics Catalog of 1943, published Dec. 21, 1942, (New York, N. Y.), pp. 209 to 211.